INVENTORS
ROBERT F. HERRGEN
ALFRED L'EPLATTENIER
BY
AGENT

United States Patent Office 3,495,142
Patented Feb. 10, 1970

3,495,142
VARIABLE VACUUM CAPACITOR
Robert F. Herrgen, Darien, Conn., and Alfred L'Eplatenier, Katonah, N.Y., assignors to The Machlett Laboratories, Incorporated, Springdale, Conn., a corporation of Connecticut
Filed Mar. 3, 1969, Ser. No. 803,860
Int. Cl. H01g 5/12
U.S. Cl. 317—249                    7 Claims

ABSTRACT OF THE DISCLOSURE

A vacuum capacitor has a spring contact between the movable plates and the envelope. The spring is mounted in the envelope or in the movable plate. In order to introduce controlled spring force in the spring element during processing of the device a recessed area is provided in the envelope or in the disc of the movable plate.

Background of the invention

Vacuum capacitors, for example, are generally constructed with an envelope containing two sets of concentric or spiral capacitor plates, at least one set being movable toward and away from the other set to vary capacitance in the well-known manner. In such devices, the movable set of capacitor plates is adjusted by means such as a bearing-mounted, axially movable shaft which has one end fixed to the movable plates and the other end projecting through an end wall of the envelope for manipulation. In order to maintain the vacuum within the device, the shaft is surrounded by a metal bellows which expands and contracts with movement of the shaft.

In order to apply suitable operating potentials to the two sets of plates in a conventional vacuum capacitor, the envelope is provided with two metal portions which form terminals and which are spaced apart by a dielectric ring of ceramic or the like. On one side of the ring, the RF current enters the capacitor through the seal between the metal and the ring and then travels along a relatively short path directly to the fixed set of capacitor plates. However, at the opposite side of the dielectric ring, the RF current enters through the dielectric-metal seal, then passes to the inner metal surface and from there is tapped oc by a plurality of metal spring elements which are connected to and movable with the movabl eset of capacitor plates, and which engage the metal wall and thus permit the current to flow more directly to the plates.

A disadvantage of vacuum electrical devices having spring elements therein, however, has been the problem of obtaining a uniform but sufficiently small spring force on the spring elements. When force is excessive, friction in vacuum will be extreme. In some cases, this problem arises from the fact that the devices, after assembly, are subjected to considerable heat during processing. Such heat sometimes causes annealing of the metal of the spring elements, thus lessening or destroying the spring force initially present in the elements.

Summary of the invention

The present invention overcomes the above and other disadvantages of known adjustable vacuum electrical devices by the provision of means for controlling the spring force of the spring elements therein so as to provide a small but controlled spring force of a magnitude which avoids excessive friction in vacuum. This is achieved by providing means whereby the spring elements are relaxed when the device is subjected to elevated temperatures during processing and are perfectly tensioned thereafter by positioning the elements in actual positions of use. This is accomplished in one form of the invention by the provision of a circumferential slot in the inner wall of the envelope at a level slightly beyond the operational area where the spring elements normally engage the wall during operation of the device. Thus, during initial device processing, the ends of the spring elements are disposed within the groove and become annealed when the device is subjected to elevated temperatures, losing their initial spring force, which initial spring force does not return upon subsequent cooling. However, when the device is thereafter ready for operation, the movable support for the spring elements is retracted, consequently pulling the elements out of the slot or groove into sliding engagement with the operational area of the envelope wall. This introduces or creates the desired spring force in the spring elements, allowing them to be maintained in frictional engagement with the wall, but with a tension or pressure which is not undesirably great.

In a second embodiment of the invention, the spring elements are carried by the envelope wall and yieldably slidably engage a ring carried by the adjustable support. The ring is movable, however, to a position where the spring elements may become disengaged from the wall and become deflected beyond the end of the ring. After processing, the ring is again moved against the spring elements, causing slight but controlled tension to be introduced as desired.

Brief description of the drawing

The above and other features of this invention will become apparent from the following description taken in connection with the accompanying drawings, wherein.

Description of the preferred embodiments

Figures 1, 2:
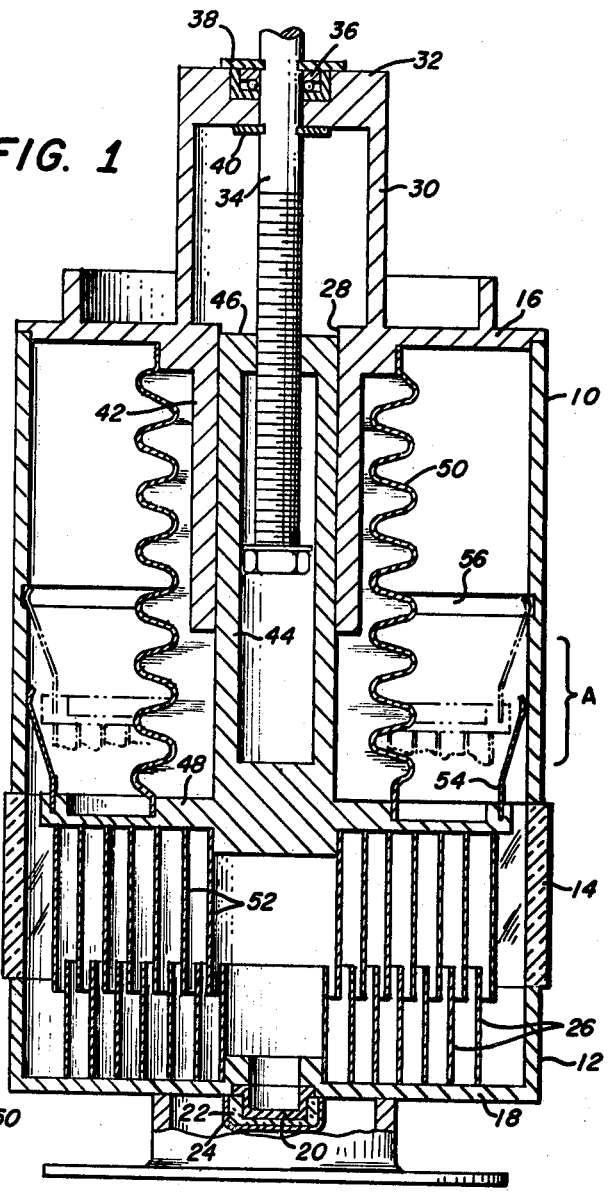
FIG. 1 is an axial sectional view of a variable vacuum capacitor embodying a preferred form of the present invention.
FIG. 2 is an enlarged sectional view illustrating a modification of the invention shown in FIG. 1.

Referring more particularly to the drawings wherein like characters of reference designate like parts throughout the several views, the invention is shown as applied to a variable vacuum capacitor in the drawings. However, it should be understood that the invention is applicable to other vacuum-type electrical devices such as klystrons or other cavity devices having slidable tuning plungers. The device shown in FIG. 1 includes a housing or envelope which comprises a pair of concentric tubular wall sections 10 and 12 sealed at their adjacent ends by a dielectric wall section or ring 14. Respective metal end walls 16 and 18 are provided at the ends, as shown. The housing may have any appropriate dimensions. The metal walls 10 and 12 are preferably formed of copper, and the dielectric ring 14, preferably alumina ceramic, is sealed to the metal walls by any suitable metal-ceramic sealing process.

One end wall 18 is provided with an aperture within which a pinch-off 20 is sealed whereby the interior of the housing may be evacuated in the well-known manner. The pinch-off 20 is protected by a suitable epoxy encapsulation 22 and metal cap 24.

The inner surface of end wall 18 supports one end of a set of capacitor plates 26, preferably of phosphor bronze, which plates may be arranged in a spaced concentric or spiral configuration, the opposite ends of plates 26 extending freely into the interior of the housing or envelope.

The opposite end wall 16 is provided with a central aperture 28 having a surrounding outwardly projecting fixed cylinder 30 thereon. Cylinder 30 is closed at its outer end by end wall or cap 32. An operating shaft 34 extends axially through cylinder 30 and projects outwardly through end cap 32 so as to provide means for physical rotation, as is usual in devices of this character. A suitable bearing 36 is provided for ease of rotation. Split rings or washers 38 and 40 carried by the shaft 34 adjacent opposite sides of end cap 32 prevent axial movement of the shaft while permitting rotary movement thereof.

End wall 16 is also provided with a fixed, inwardly extending cylinder 42 substantially concentric with cylinder 30. Within cylinder 42 is a hollow metal sleeve 44 which closely interfits therewith for sliding movement therein in an axial direction. To effect such sliding movement, sleeve 44 is closed at its outer end by end wall 46, which end wall 46 is provided with a threaded aperture receiving the threaded shank of shaft 34. Thus, end wall 46 becomes effectively a nut on shaft 34 whereby, when shaft 34 is rotated, the sleeve 44 will consequently be moved axially of the device.

Mounted on the inner end of the sleeve 44 and movable therewith is a transversely extending metal carrier or disc 48. The periphery of disc 48 is located in spaced relation to the inner walls of the envelope, and has sealed to its upper surface one end of a metal bellows 50 which encloses the sleeve 44 and the inner cylinder 42 and functions, with disc 48, to seal off the evacuated portion of the device. From this, it will be apparent that rotary movement of shaft 34 will consequently effect movement of disc 48 axially of the device, whereupon bellows 50 will contract and expand in the usual manner.

The opposite side of disc 48 carries a second set of capacitor plates 52, one end of the plates being sealed directly to the disc in any suitable manner and the other end of the plates being directed toward the first set of plates 26. Plates 52 are assembled and configured similar to plates 26 and are adapted, upon movement of disc 48, to intermesh with plates 26 in the usual manner of a variable vacuum capacitor of this type.

The foregoing describes the essential features of a conventional variable vacuum capacitor wherein potentials are applied to the two sets of capacitor plates 26 and 52 and capacitance of the device is varied by physically moving one set of plates with respect to the other. The potentials may be applied by utilizing the metal walls 10 and 12 as terminals and connecting them into associated circuitry (not shown) in any suitable manner.

In operation of the device, RF current will enter the capacitor from wall 12 through the seal between wall 12 and ring 14, and will then pass downwardly along the inner surface of wall 12 to the adjacent inner surface of end wall 18, thence directly to the first set of capacitor plates 26. This RF current path is relatively short and does not provide serious problems.

However, in order to get current to the second set of capacitor plates 52, current will enter from metal wall 10 through the seal between wall 10 and ring 14, and thus will pass to the inner surface of wall 10.

In order to aid in reducing such losses in a conventional capacitor, it has become customary to use OFHC copper for the bellows 50 since the conductivity of copper is several times greater than that of Phosphor bronze which is more desirable because of its more excellent mechanical life. OFHC copper bellows, however, have relatively poor mechanical life.

The RF current passing upwardly along the inner surface of wall 10 is interrupted or "tapped off" in the one form of the present invention by means of a plurality of metal elements 54 which preferably comprise spring fingers having one end fixed to disc 48 with the other ends bearing against and slidable along the inner surface of wall 10. The spring elements 54 may be of beryllium copper, for example, and are provided in sufficient numbers to extend around the entire periphery of disc 54, being spaced sufficiently close to one another to provide excellent current-carrying characteristics. The spring elements 54 are also provided with controlled spring force to maintain their contact with wall 10 without creating undue drag or physical resistance, as will be described.

With metal elements 54 in engagement with the wall 10, RF current will flow through the seal between wall 10 and ring 14, along the inner surface of wall 10 for a short distance until it is intercepted by elements 54, then along the surfaces of elements 54 to the disc 48 and plates 52.

It has been found difficult, however, to provide the spring elements 54 with a relatively small but accurate spring force since tolerances in and misalignment between disc 48 and wall 10 make it difficult to achieve a relatively small and accurate spring force all around the inside of wall 10. Also, during processing of the capacitor, the spring elements 54 may become annealed by the relatively high temperatures to which they are subjected, such as about 450° C., for example. When subsequently cooled, the metal of such elements recovers a spring force determined by the positions or shapes which the spring elements take at that time. For relatively small forces, for example, five grams, the deflection must be small, typically about .010 inch, or the fingers must be long or very thin. Long or thin fingers are not practical.

Accordingly, these additional problems have been overcome in the present invention by providing means for introducing the desired spring force into the spring elements 54 after processing has been completed. This is achieved by determining the full operational range or extent of area of the wall 10 which will be engaged by the spring elements 54 during operational use of the capacitor. Such operational area is indicated at "A" in FIG. 1. Furthermore, this may be achieved by selecting material for the spring elements which sets at the processing temperature, such as BeCu.

Beyond operational area A, the inner surface of wall 10 is provided with a circumferential groove or step 56 of a predetermined depth which will create in the spring elements the desired spring force after heat treatment. During processing of the capacitor, the movable parts of the device will be retracted to a point where the spring elements will pass out of the operational area A and will fall into the groove 56. Since the elements have previously been provided with spring force, the ends thereof will engage the bottom of the groove with some degree of pressure or force. This position of the elements is illustrated by dotted lines in FIG. 1.

During processing, the capacitor will be subjected to relatively high temperatures such as about 450° C., for example. These temperatures, followed by cooling, cause the BeCu spring elements to become set and hardened in the new position in the groove. After cooling, the elements rest upon the bottom of the groove without substantial pressure or force. However, when the movable parts of the device are thereafter adjusted to place the spring elements 54 in engagement with the operational area A of wall 10, the actual flexing of the elements 54 as they are pulled out of the groove onto the wall surface provides the elements with the desired spring force. It will be apparent that different amounts of spring force may be introduced into elements 54 by grooves or steps 56 of different depths. A groove depth of about .012 inch, for example, will be satisfactory in many instances. Thus, the spring elements will be constantly maintained in engagement with the wall of the envelope with a selected amount of spring force such as will provide good electrical contact without undesirable friction.

Referring now to the embodiment of the invention disclosed in FIG. 2, only that portion of a vacuum device is shown which is actually pertinent to the invention; that is, there is shown a metal wall 10 sealed to a ceramic ring 14. Within the device is a metal disc 48 which carries capacitor plate set 52 on its under side and has bellows 50 extending upwardly from its upper side. The spring elements 54a are, in this embodiment, attached directly to the inner surface of wall 10, and the free ends thereof engage the outer surface of an upwardly directed circular flange or ring 70 attached to or formed on the periphery of disc 48. This is shown in full lines in FIG. 2, and it will be seen that the free end of spring element 54a will ride along the surface of flange 70 as the flange moves up and down through the extent of operational area A.

When the device is to be subjected to heat during processing, however, the disc 48 and flange 70 are moved upwardly past operational area A to a point where the spring elements or fingers 54a slip beyond the bottom edge of disc 48, as shown in dot-dash lines in FIG. 2. This relaxes the spring tension in the spring elements, as described hereinbefore. Thereafter, when the disc and flange are lowered, the flange will engage the spring fingers, bending them back slightly toward the wall 10. This introduces the required amount of spring force desired in the elements 54a.

It will also be apparent that the effect of the groove 56 can be achieved in the FIG. 1 structure by providing a step at the upper extent of operational area A. This may be achieved by making the inner surface of the wall above area A slightly larger in diameter than the inner surface of the wall throughout area A.

From the foregoing, it will be apparent that all of the objectives of this invention have ben achieved by the structures shown and described. It will be also apparent, however, that various changes may be made by those skilled in the art without departing from the spirit of the invention as expressed in the appended claims. It is to be understood, therefore, that all matter shown and described is to be interpreted as illustrative and not in a limiting sense.

We claim:

1. An electrical device comprising a hollow envelope containing a pair of spaced electrodes, one electrode being movable toward and away from the other, metal spring means between and electrically connecting the movable electrode and the wall of said envelope throughout an operational area corresponding to the extent of movement of the movable electrode during normal operation of the device, said spring means having a spring force determined by the spacing between the wall and the electrode, and means located outside said operational area for receiving said spring means whereby the spring force therein will be of a lesser amount.

2. An electrical device as set forth in claim 1 wherein said spring means are carried by the movable electrode and slidably engage the wall of the envelope.

3. An electrical device as set forth in claim 2 wherein said last means is a recessed area in the wall of the envelope.

4. A variable capacitor comprising a hollow envelope having a cylindrical, electrically conductive wall portion, a pair of electrodes mounted within the envelope and comprising spaced plates, one of said electrodes being movable toward and away from the other for interleaving said plates, and electrically conductive spring means carried by said movable electrode, for conducting RF current from said wall portion to the electrode, said spring means comprising spring elements slidably engaging said wall portion with predetermined spring force throughout an operational area corresponding to the extent of movement of the movable electrode during normal operation of the capacitor, and means outside said operational area for receiving said spring elements whereby the spring force therein will be of a lesser amount.

5. A variable capacitor as set forth in claim 4 wherein said last means comprises a recessed area in the wall of the envelope.

6. A variable capacitor as set forth in claim 4 wherein said spring elements are located in an annular array around the periphery of the movable electrode, and said last means comprises a circumferential groove in the inner surface of said wall.

7. A variable capacitor as set forth in claim 5 wherein said recessed area is of a predetermined depth in accordance with the desired spring force in said spring elements.

References Cited

UNITED STATES PATENTS 3,432,734   3/1969   Johanson _____ 317—245

E. A. GOLDBERG, Primary Examiner

U.S. Cl. X.R.

317—245, 251